3,290,600
WIDE-BAND DISCRIMINATORS

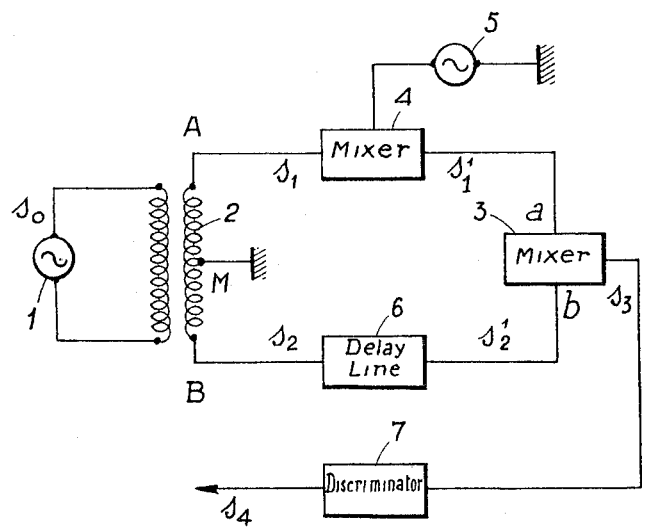

Léon Malnar, Paris, France, assignor to CSF-Compagnie Generale de Telegraphie Sans Fil, a corporation of France
Filed July 31, 1963, Ser. No. 298,819
Claims priority, application France, Aug. 14, 1962, 906,920, Patent 1,338,511
2 Claims. (Cl. 325—345)

The present invention relates to discriminators.

In some applications it is difficult to extract information from a frequency-modulated wave. This is especially the case when the mean frequency of the signal is not accurately determined, or when it is subject to variations.

It is an object of the invention to provide an arrangement avoiding this difficulty.

A frequency discriminator according to the invention comprises two channels one of which receives the signal and the other the same signal with a phase shift, for example, of $\pi$, these two channels feeding a mixer. In one channel, means is provided for mixing the received signal with a local frequency stabilized wave. The other channel comprises means for delaying the signal. The output of the mixer feeds a conventional frequency discriminator operating on a fixed mean frequency.

The invention will be better understood by means of the following description with reference to the appended drawing, the only figure of which shows a circuit diagram of an arrangement according to the invention.

In this figure a source 1, which supplies the signal from which information is to be extracted, feeds the primary winding of a transformer 2, whose secondary winding has two terminals A and B and a midpoint M which is grounded. A mixer 3, having two inputs has one input $a$ connected to the output of another mixer 4, whose inputs are respectively connected to terminal A and to a stabilized local oscillator 5.

The other input $b$ of mixer 3 is connected to the output of a delay line 6, giving a fixed delay $\tau$, and whose input is connected to terminal B. The output of mixer 3 feeds a discriminator 7, which delivers the information at its output.

The arrangement operates as follows:
The signal at terminal A may be written:

$$s_1 = A \sin [\omega_i t + \varphi(t)] \qquad (1)$$

where $\varphi(t)$ is the variable phase, which contains the information and varies at the rate of the information, and $\omega_i$ is the mean angular frequency, which is unknown and may vary within certain limits.

The signal at terminal B is $$s_2 = -A \sin [\omega_i t + \varphi(t)] \qquad (2)$$

The instantaneous angular frequency of signals $s_1$ and $s_2$ is $$\omega = \omega_i + \varphi'(t) \qquad (3)$$

Let $\omega_0$ be the stabilized angular frequency of oscillator 5.

Mixer 4 supplies to mixer 3 a signal which can be written:

$$s_1^1 = A \sin [(\omega_i + \omega_0)t + \varphi(t)] \qquad (4)$$

Delay line 6 supplies mixer 3 with a signal which:

$$s_2^1 = A [\sin \omega_i(t-\tau) + \varphi(t-\tau)] \qquad (5)$$

The signal at the output of mixer 3 can be written:

$$s_3 = A \sin [\omega_0 t + \omega_i \tau + \varphi(t) - \varphi(t-\tau)] \qquad (6)$$

It should be observed that signal contains no term in $\omega_i t$ and contains:

(a) a term in $\omega_0 t$, $\omega_0$ being constant;

(b) a term in $\omega_i \tau$ which carries no information: this term may be considered to vary slowly at the rate of the variation of $\omega_i$, the mean frequency $\omega_i/2\pi$ being assumed to vary slowly as compared to the period 1/F, which is the reciprocal of the rate of information;

(c) a term containing the information signal, i.e.: $s_3^1 = \varphi(t) - \varphi(t-\tau)$, which if $\tau$ is small compared to 1/F, can be written:

$$s_3^1 = \tau \varphi'(t) = 2\pi\tau s, \text{ where } s = \frac{\varphi'(t)}{2\pi} \qquad (7)$$

Discriminator 7 then supplies the output signal $$s_4 = k\tau s^1$$

where $k$ is the discriminator gain. This discriminator is then centered on frequency $\omega_0$.

The choice of the delay line is governed by the figure of merit S of the discriminator. It is known that the figure of merit of a discriminator is the ratio:

$$S = \frac{\Delta f_m}{B}$$

where B is the discriminator pass-band, and $\Delta f_m$ the minimum frequency variation at its input.

In the present case, the minimum frequency variation to be detected is the minimum frequency variation of the signal $s_3$ $$\Delta f_m = \left(\frac{\frac{ds_2^1}{dt}}{2\pi}\right)_m = \tau \cdot |s^1|_m$$

Defining, the rate of information as $$F = \frac{1}{2\pi} \frac{s^1(t)}{s(t)}$$

$$\Delta f_m = 2\pi F \tau s_m$$

hence:

$$s_m = \frac{\Delta f_m}{2\pi F \tau} = \frac{S \cdot B}{2\pi F \tau} \qquad (8)$$

Assuming the frequency $f_0$ of the local oscillator to provide a correct mixing over the whole frequency band from 70 to 250 kc./s., assuming the discriminator to have a pass-band of 100 c./s. and S to be of the order of $2 \times 10^{-6}$, if it is desired to obtain a rate of information F greater than 1 c./s.; then $$s_m = \frac{3 \times 10^{-5}}{\tau}$$

If $s_1$ is of the order of 0.03 c./s., $\tau$ has to be of the order of $10^{-3}$ second.

Such a delay time can be obtained in the range of medium frequencies. It does not have to be strictly constant over that band, since the term in $\tau$ in Formula 6 is $\omega_i \tau$; this term, assumed to vary slowly, is not recorded by the discriminator.

In conclusion, the arrangement according to the invention gives good results when the rate of information is high.

It possesses the following advantages:

(a) The main discrimination is effected by a conventional discriminator whose working point is centered on the middle of its characteristic, since it works with a fixed frequency carrier.

(b) The delay line may be of a simple type since the delay time need not be strictly constant.

What is claimed is:

1. A frequency discriminator for extracting the information from a frequency modulated wave, the carrier frequency of which is variable, comprising: a mixer having two inputs and an output; another mixer coupled to one of said inputs; means for feeding to said other mixer said wave and a fixed frequency signal; a delay line coupled to said other input; means for phase shifting said wave by a predetermined phase shift; means for feeding said phase shifted wave to said delay line; and a phase discriminator coupled to said output.

2. A frequency discriminator for extracting the information from a frequency modulated wave, the carrier frequency of which is variable, comprising: a mixer having two inputs and an output; another mixer coupled to one of said inputs; means for feeding to said other mixer said wave and a fixed frequency signal; a delay line coupled to said other input; means for phase shifting by $\pi$ said wave; means for feeding said phase shifted wave to said delay line; and a phase discriminator coupled to said output.

No references cited.

KATHLEEN H. CLAFFY, *Primary Examiner.*

A. H. GESS, *Assistant Examiner.*